UNITED STATES PATENT OFFICE.

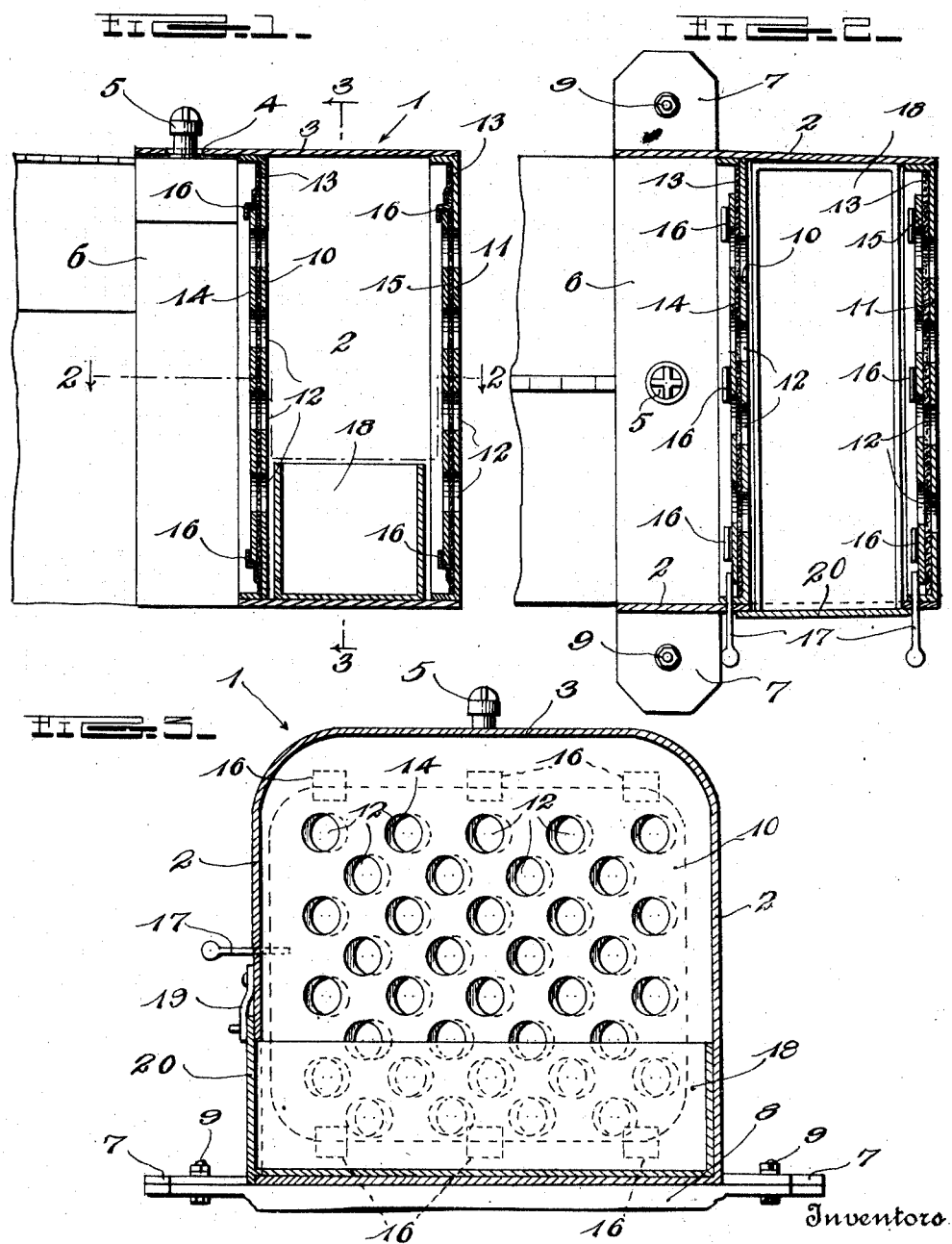

JOHN W. DAVIS AND JOHN W. OSBORNE, OF WINCHESTER, ILLINOIS, ASSIGNORS OF FOUR-TWELFTHS TO SAID DAVIS, THREE-TWELFTHS TO SAID OSBORNE, AND FIVE-TWELFTHS TO CHESTER L. WILLIAMS, OF CHAPIN, ILLINOIS.

RADIATOR-HEATER.

1,390,887.     Specification of Letters Patent.     Patented Sept. 13, 1921.

Application filed May 24, 1920. Serial No. 383,851.

*To all whom it may concern:*

Be it known that we, JOHN W. DAVIS and JOHN W. OSBORNE, citizens of the United States, residing at Winchester, in the county of Scott and State of Illinois, have invented certain new and useful Improvements in Radiator-Heaters, and do declare the following to be a full, clear, and exact description of the invention, such as will enable others skilled in the art to which it appertains to make and use the same.

This invention relates to an improved heater for use in connection with the radiator of an automobile and one object of the invention is to provide a heater which is so constructed that it can be easily and quickly connected with the radiator and supply heat which will prevent the water in the radiator from freezing when the automobile is not in use. It often happens that when an automobile is left standing for a long time, the water in the radiator will become very cold and thus make it difficult to start the motor and it also often happens that the water will freeze, thus making it impossible to use the automobile until the ice has been melted. In addition to preventing the use of the automobile, the formation of ice often causes the radiator and water pipes to crack. With this device, the radiator can be kept warm and thus freezing or excessive cooling of the water prevented.

Another object of the invention is to so construct this heater that the passage of air through the housing may be controlled and thus the charcoal or other fuel used prevented from being rapidly consumed in case the heater is left in place while the automobile is in use.

Another object of the invention is to so construct the heater that it may be removed when desired and to further so construct the heater that the fuel carrying receptacle or drawer may be easily removed and a new supply of fuel provided.

This invention is illustrated in the accompanying drawings wherein

Figure 1 is a view showing the heater in vertical section and applied to an automobile radiator shown in elevation.

Fig. 2 is a transverse sectional view taken along the line 2—2 of Fig. 1 with the automobile radiator shown in top plan.

Fig. 3 is a vertical sectional view taken along the line 3—3 of Fig. 1.

This heater is provided with a housing 1 having side walls 2 and an upper wall or top 3 which is provided with an opening 4 for receiving the neck 5 of an automobile radiator 6 when the heater is put in place as shown. Tongues 7 extend from the side walls and are connected with the end portions of the yoke 8 which supports the radiator by means of bolts 9 which can be easily removed when it is desired to remove the heater from the radiator.

This housing is provided with heads 10 and 11 which are formed of metal similar to the walls and are provided with openings 12 through which air may pass when entering and leaving the heater. Strips of asbestos indicated by the numeral 13 are secured to the faces of the heads 10 and 11 and are provided with openings registering with the openings 12. The heads 10 and 11 carry the plates 14 and 15 which may be termed valve plates or closure plates. These plates are slidably held in place by cleats 16 and provided with openings which may be moved into and out of registry with the openings of the heads. These valve plates 14 and 15 are provided with actuating rods 17 which extend through one side of the housing 1 and therefore when it is desired to control the entrance of air and passage of air through the housing, the plates can be moved to bring the openings thereof into or out of registry with the openings in the heads.

When in use, the housing will be put in place as shown in Figs. 1 and 2 with the neck 5 extending through the opening 4 and the tongues 7 secured by the bolts 9. The drawer or fuel receptacle 18 will be withdrawn from the housing and charcoal or other fuel placed in this receptacle. The receptacle carrying the lighted fuel can then be put back in place and secured by a suitable fastener 19 which engages the outer end portion 20 of this receptacle and the receptacle will be prevented from moving out of the housing. When the automobile is in operation it is not desired to have the air pass through the housing as this would cause the fuel to be rapidly consumed and since the water in the radiator is heated by the motor when in operation it is not necessary to have the water heated by other means. Therefore, the valve plates 14 and 15 will be moved to close the openings 12 and thus shut off the draft. When the automobile is not in use and is to be left standing for some time, the valve plates will be moved to uncover the openings in the heads and air can then pass through the housing and through the radiator. This air in passing through the housing will be heated and this heated air will serve to heat the radiator and prevent the water from becoming chilled beyond a desired amount and particularly prevent the formation of ice in the radiator. It will thus be seen that there will be no danger of the radiator freezing and becoming cracked and also that the motor will not be prevented from starting easily by excessive chilling of the water. When the heater is no longer needed, the bolts 9 can be removed and the heater then easily and quickly removed from in front of the radiator and put away until again needed.

We claim:

1. A heating attachment for a radiator comprising a housing having upper and side walls for engagement with a radiator and having perforated front and rear heads connected with the upper and side walls, plates slidably connected with the front and rear heads and having openings to register with the openings of the heads, means for moving the plates to move the openings thereof into and out of registry with the openings of the heads, and a receptacle for a heating medium mounted in the housing.

2. A heating attachment for a radiator comprising a housing having walls extended for engagement with a radiator and having side extensions forming attaching feet, front and rear heads carried by the walls and having openings, closure-plates slidably connected with the heads and having openings for registering with the openings of the heads when in one position, and a receptacle for a heating medium in the housing.

3. A heating attachment for a radiator comprising a housing having front and rear heads provided with openings, a receptacle for a heating medium extending into the housing through an opening in one side wall, closure plates slidably connected with the front and rear heads and having openings for registering with the openings of the heads, and actuating means for the plates extending externally of the housing.

4. A heating attachment for a radiator comprising a housing supportable in contact with the front of a radiator, the housing having front and rear heads provided with openings, a receptacle for a heating medium mounted for sliding movement into and out of the housing, and plates slidably connected with the front and rear heads of the housing and provided with openings for registering with the openings of the heads.

5. A heating attachment for a radiator comprising a housing having side walls and perforated front and rear walls, the side walls being extended rearwardly and having outstanding attaching feet and one of the side walls having an opening formed therein, a receptacle extending through the opening of the side wall into the housing and having a head at its outer end limiting its inward movement, and perforating plates slidably connected with the front and rear walls of the housing and having actuating stems extending through the side walls.

6. A heating attachment for a radiator comprising a housing having front and rear heads provided with openings, a receptacle for a heating medium positioned in the housing, and separate means for controlling passage of air through the openings in the heads.

In testimony whereof we have hereunto set our hands.

JOHN W. DAVIS.
JOHN W. OSBORNE.